(12) United States Patent
Minoura et al.

(10) Patent No.: US 9,366,785 B2
(45) Date of Patent: Jun. 14, 2016

(54) MOLD, METHOD FOR MANUFACTURING A MOLD, AND ANTIREFLECTIVE FILM

(75) Inventors: Kiyoshi Minoura, Osaka (JP); Akinobu Isurugi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 963 days.

(21) Appl. No.: 13/504,180

(22) PCT Filed: Oct. 27, 2010

(86) PCT No.: PCT/JP2010/069095
§ 371 (c)(1),
(2), (4) Date: Apr. 26, 2012

(87) PCT Pub. No.: WO2011/052652
PCT Pub. Date: May 5, 2011

(65) Prior Publication Data
US 2012/0218639 A1 Aug. 30, 2012

(30) Foreign Application Priority Data

Oct. 28, 2009 (JP) .................................. 2009-248301

(51) Int. Cl.
*C25D 11/04* (2006.01)
*B29C 33/42* (2006.01)
(Continued)

(52) U.S. Cl.
CPC ............ *G02B 1/118* (2013.01); *B29C 33/3814* (2013.01); *B29C 33/424* (2013.01); *B29C 33/56* (2013.01); *C25D 11/045* (2013.01); *C25D 11/12* (2013.01); *C25D 11/24* (2013.01)

(58) Field of Classification Search
CPC .................. C25D 11/02–11/246; G02B 1/118
See application file for complete search history.

(56) References Cited

U.S. PATENT DOCUMENTS

| 6,359,735 B1 | 3/2002 | Gombert et al. |
| 2003/0205475 A1 | 11/2003 | Sawitowski |

(Continued)

FOREIGN PATENT DOCUMENTS

| JP | 2001517319 A | 10/2001 |
| JP | 2003531962 A | 10/2003 |

(Continued)

OTHER PUBLICATIONS

International Preliminary Report on Patentability dated Jun. 21, 2012.

(Continued)

*Primary Examiner* — James Lin
*Assistant Examiner* — Ho-Sung Chung
(74) *Attorney, Agent, or Firm* — Harness, Dickey & Pierce, P.L.C.

(57) ABSTRACT

A moth-eye mold fabrication method includes: (a) providing an aluminum film deposited on a base, the aluminum film having a thickness of not less than 0.5 μm and not more than 5 μm, a surface of the aluminum film having a plurality of crystal grains whose average crystal grain diameter is not less than 200 nm and not more than 5 μm; (b) after step (a), anodizing the surface of the aluminum film to form a porous alumina layer which has a plurality of minute recessed portions; and (c) after step (b), bringing the porous alumina layer into contact with an etching solution, thereby enlarging the plurality of minute recessed portions of the porous alumina layer. A method of readily fabricating a mold is produced that is for manufacture of an antireflection film in which a moth-eye structure is superposed over an antiglare structure.

6 Claims, 11 Drawing Sheets

(51) Int. Cl.
  *G02B 1/11*    (2015.01)
  *G02B 1/118*   (2015.01)
  *B29C 33/38*   (2006.01)
  *B29C 33/56*   (2006.01)
  *C25D 11/24*   (2006.01)
  *C25D 11/12*   (2006.01)

(56) References Cited

U.S. PATENT DOCUMENTS

2004/0163441 A1    8/2004  Sawitowski
2007/0116934 A1*   5/2007  Miller ........................... 428/172
2007/0159698 A1    7/2007  Taguchi et al.
2010/0243458 A1*   9/2010  Kojima et al. ................. 205/50

FOREIGN PATENT DOCUMENTS

JP        2005156695 A      6/2005
JP           4265729 A      2/2009
WO    WO-2006059686 A1      6/2006
WO    WO 2009054513 A1 *    4/2009

OTHER PUBLICATIONS

International Search Report.

* cited by examiner (a)

(b)

(a)

(b)

(a)

(b)

(a)

(b)

(a)

(b)

(a)

(b)

(a)

(b)

(a)

(b)

MOLD, METHOD FOR MANUFACTURING A MOLD, AND ANTIREFLECTIVE FILM

TECHNICAL FIELD

The present invention relates to a mold, a method of fabricating a mold, and an antireflection film. In this specification, the "mold" includes molds that are for use in various processing methods (stamping and casting), and is sometimes referred to as a stamper. The mold can also be used for printing (including nanoimprinting).

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called moth-eye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The moth-eye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a moth-eye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (minute recessed portions) in the shape of a circular column in a regular arrangement. A base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer formed under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

Patent Document 4 discloses the technique of forming an antireflection film with the use of an alumina layer in which minute recessed portions have stepped lateral surfaces.

As described in Patent Documents 1, 2, and 4, by providing an uneven structure (macro structure) which is greater than a moth-eye structure (micro structure) in addition to the moth-eye structure, the antireflection film (antireflection surface) can be provided with an antiglare function. The two-dimensional size of a raised portion of the uneven structure which is capable of performing the antiglare function is not less than 1 μm and less than 100 μm. The entire disclosures of Patent Documents 1, 2, and 4 are herein incorporated by reference.

Utilizing an anodized porous aluminum film can facilitate the fabrication of a mold which is used for formation of a moth-eye structure over a surface (hereinafter, "moth-eye mold"). In particular, as described in Patent Documents 2 and 4, when the surface of the anodized aluminum film as formed is used as a mold without any modification, a large effect of reducing the manufacturing cost is achieved. The structure of the surface of a moth-eye mold which is capable of forming a moth-eye structure is herein referred to as "inverted moth-eye structure".

A known antireflection film manufacturing method with the use of a moth-eye mold uses a photocurable resin. Firstly, a photocurable resin is applied over a substrate. Then, an uneven surface of a moth-eye mold which has been provided with a mold release treatment is pressed against the photocurable resin in vacuum. Thereafter, the uneven structure is filled with the photocurable resin. Then, the photocurable resin in the uneven structure is irradiated with ultraviolet light so that the photocurable resin is cured. Thereafter, the moth-eye mold is separated from the substrate, whereby a cured layer of the photocurable resin to which the uneven structure of the moth-eye mold has been transferred is formed over the surface of the substrate. The method of manufacturing an antireflection film with the use of the photocurable resin is disclosed in, for example, Patent Document 4.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686

SUMMARY OF INVENTION

Technical Problem

The method of fabricating a mold that is for manufacture of an antireflection film in which a moth-eye structure is superposed over an antiglare structure, such as disclosed in Patent Documents 1, 2 and 4, requires the step of forming an uneven structure which is used for forming an antiglare structure beforehand, independently of the step of forming an inverted moth-eye structure. For example, Patent Document 1 discloses forming an uneven structure which is used for formation of an antiglare structure by mechanical means, such as sand blast or shot peening with glass beads, independently of the step of forming an inverted moth-eye structure.

One of the major objects of the present invention is to provide a method of simply fabricating a mold which is for use in manufacture of an antireflection film that has an antiglare structure and a moth-eye structure superposed over the antiglare structure.

Solution to Problem

A mold fabrication method of the present invention is a method of fabricating a mold that has an inverted moth-eye structure in its surface, the inverted moth-eye structure having a plurality of recessed portions whose two-dimensional size viewed in a direction normal to the surface is not less than 50 nm and less than 500 nm, the method including the steps of: (a) providing an aluminum film deposited on a base, the aluminum film having a thickness of not less than 0.5 μm and not more than 5 μm, a surface of the aluminum film having a plurality of crystal grains whose average crystal grain diameter is not less than 200 nm and not more than 5 μm; (b) after step (a), anodizing the surface of the aluminum film to form a porous alumina layer which has a plurality of minute recessed portions; and (c) after step (b), bringing the porous alumina layer into contact with an etching solution, thereby enlarging the plurality of minute recessed portions of the porous alumina layer.

Another mold fabrication method of the present invention is a method of fabricating a mold that has an inverted moth-eye structure in its surface, the inverted moth-eye structure having a plurality of recessed portions whose two-dimensional size viewed in a direction normal to the surface is not less than 50 nm and less than 500 nm, the method including the steps of: (a) providing an aluminum film deposited on a base, the aluminum film having a thickness of not less than 0.5 μm and not more than 5 μm, a surface of the aluminum film having a plurality of crystal grains whose crystal grain diameter distribution has two local maximums, the larger one of the local maximums being not less than 200 nm; (b) after step (a), anodizing the surface of the aluminum film to form a porous alumina layer which has a plurality of minute recessed portions; and (c) after step (b), bringing the porous alumina layer into contact with an etching solution, thereby enlarging the plurality of minute recessed portions of the porous alumina layer. Here, the shape of the base may have any of a flat surface, a curved surface, and a roll surface, for example. The material of the base may be an acid-resistant insulating material, such as a glass, ceramic, or plastic material, for example. The base may be an aluminum base, for example. Alternatively, for example, the base may be realized by providing an insulating material over a non-aluminum metal material.

In one embodiment, a crystal grain diameter distribution of the plurality of crystal grains is wider than a range of ±50 nm from the average crystal grain diameter.

In one embodiment, an average crystal grain diameter of the plurality of crystal grains is not less than 200 nm and not more than 5 μm, and the larger local maximum of the crystal grain diameter distribution of the plurality of crystal grains is not less than 400 nm.

In one embodiment, 5% or more of the plurality of crystal grains have a grain diameter of greater than $R1-\{(R1-R2)/2\}$, where R1 is the larger local maximum of the crystal grain diameter distribution of the plurality of crystal grains, and R2 is the smaller local maximum.

In one embodiment, an n-point average roughness (Rz) of the surface of the aluminum film is not less than 100 nm.

The mold fabrication method of one embodiment further includes the step (d) of further anodizing the surface of the aluminum film to grow the plurality of minute recessed portions, wherein, after step (c), step (d) and step (c) are further performed.

A mold of the present invention includes a porous alumina layer in its surface, wherein the porous alumina layer has an inverted moth-eye structure that has a plurality of recessed portions whose two-dimensional size viewed in a direction normal to the surface is not less than 50 nm and less than 500 nm, and a plurality of raised portions whose average two-dimensional size viewed in a direction normal to the surface is not less than 200 nm and not more than 5 μm.

Another mold of the present invention includes a porous alumina layer in its surface, wherein the porous alumina layer has an inverted moth-eye structure that has a plurality of recessed portions whose two-dimensional size viewed in a direction normal to the surface is not less than 50 nm and less than 500 nm, and a plurality of raised portions, a distribution of a two-dimensional size of the raised portions viewed in a direction normal to the surface having two local maximums, the larger one of the local maximums being not less than 200 nm.

In one embodiment, the distribution of the two-dimensional size of the plurality of raised portions is wider than a range of ±50 nm from an average two-dimensional size of the plurality of raised portions.

In one embodiment, an average two-dimensional size of the plurality of raised portions is not less than 200 nm and not more than 5 μm, and the larger one of the local maximums of the distribution of the two-dimensional size of the plurality of raised portions is not less than 400 nm.

In one embodiment, 5% or more of the plurality of raised portions have a two-dimensional size of greater than $L1-\{(L1-L2)/2\}$, where L1 is the larger local maximum of the distribution of the two-dimensional size of the plurality of raised portions, and L2 is the smaller local maximum.

An antireflection film of the present invention has an uneven structure which is inverse of an uneven structure of the surface of the above-described mold.

In one embodiment, an integrating sphere reflectance of the antireflection film is less than 0.3%, and a haze value of the antireflection film is not less than 1% and not more than 5%.

In one embodiment, the aluminum film is formed according to a vacuum deposition method.

Advantageous Effects of Invention

The present invention provides a method of simply fabricating a mold which is for use in manufacture of an antireflection film that has an antiglare structure and a moth-eye structure superposed over the antiglare structure.

DESCRIPTION OF EMBODIMENTS

Hereinafter, a moth-eye mold and a method of fabricating the moth-eye mold according to an embodiment of the present invention will be described with reference to the drawings. However, the present invention is not limited to the embodiment which will be illustrated below.

Figure 1:
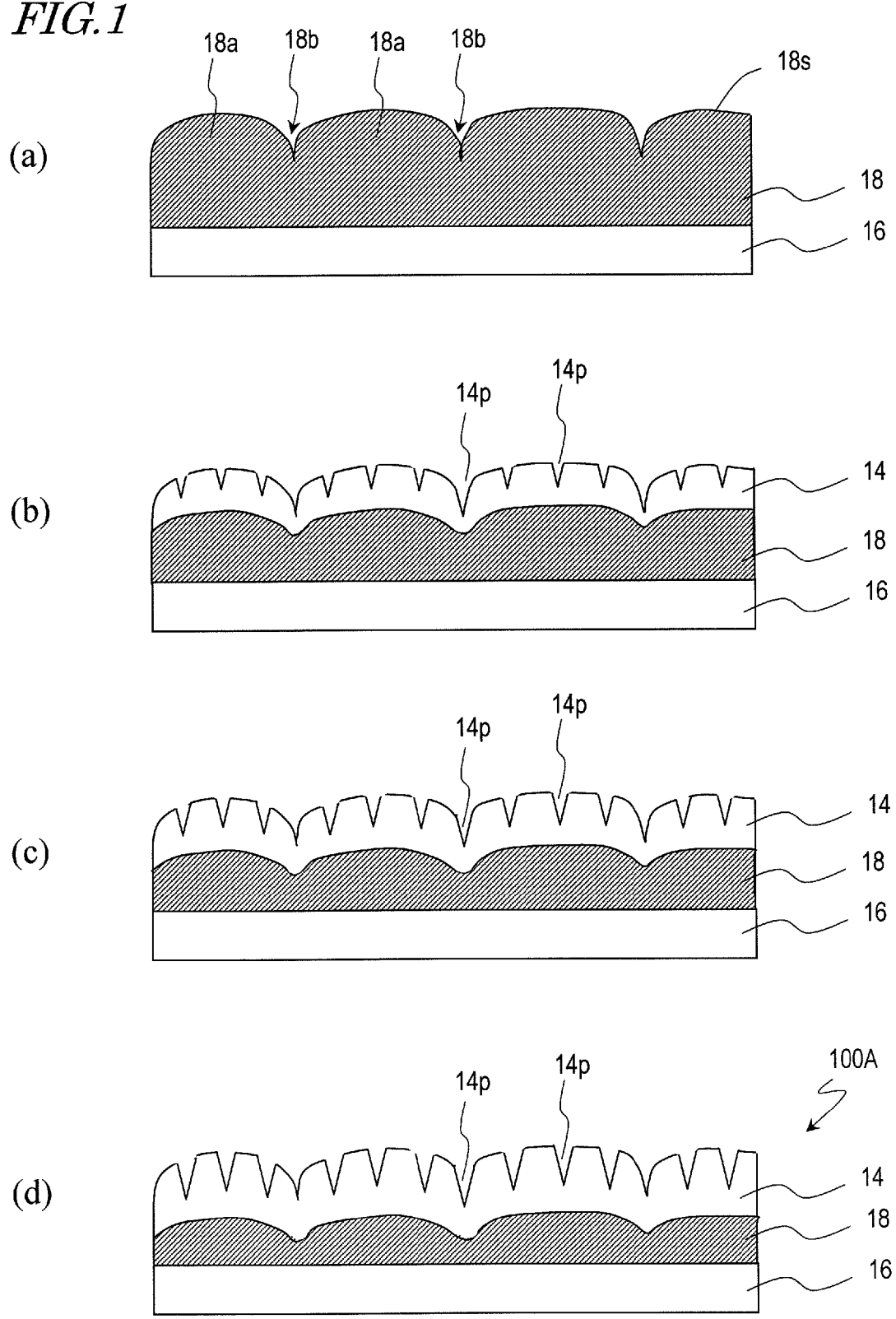
FIG. 1 (a) to (d) are schematic cross-sectional views for illustrating a mold fabrication method of an embodiment of the present invention.

The mold fabrication method of the embodiment of the present invention includes, as shown in FIGS. 1(a) to 1(c), the step of providing an aluminum film 18 deposited on a base 16, the aluminum film 18 having a thickness of not less than 0.5 µm and not more than 5 µm, the aluminum film 18 having a plurality of crystal grains in its surface, an average crystal grain diameter of the crystal grains being not less than 200 nm and not more than 5 µm (FIG. 1(a)), the step of anodizing a surface 18s of the aluminum film 18 to form a porous alumina layer 14 which has a plurality of minute recessed portions 14p (FIG. 1(b)), and the step of bringing the porous alumina layer 14 into contact with an etching solution, thereby enlarging the plurality of minute recessed portions 14p of the porous alumina layer 14 (FIG. 1(c)). Note that, in this specification, the crystal grain diameter means the two-dimensional size of a crystal grain when viewed in a direction normal to the aluminum film. The crystal grain diameter can be examined from, for example, a SEM image of the surface of the aluminum film.

The moth-eye mold fabrication method of the embodiment of the present invention is characterized in that the thickness of the aluminum film 18 is not less than 0.5 µm and not more than 5 µm, and the surface 18s of the aluminum film 18 has a plurality of crystal grains whose average crystal grain diameter is not less than 200 nm and not more than 5 µm.

The present inventor has been developing the technique of fabricating a moth-eye mold by repeating anodization and etching with the use of an aluminum film which is formed on a substrate (e.g., glass substrate) using a thin film deposition technique. According to the technique which has been developed up to now by the present inventor the average crystal grain diameter of the aluminum film was about 180 nm to 190 nm.

According to the researches conducted by the present inventor, it was found that an aluminum film whose average crystal grain diameter is not less than 200 nm can be formed by modifying the film formation conditions for the aluminum film (e.g., the substrate temperature and the substrate thickness). It was found that, particularly, by modifying the above film formation conditions in formation of an aluminum film which has a thickness of not less than 0.5 µm, an aluminum film whose average crystal grain diameter is not less than 200 nm, which is greater than that of the prior art aluminum film, can be formed.

According to the researches conducted by the present inventor, it was found that a surface of a moth-eye mold which is fabricated by repeating anodization and etching with the use of an aluminum film that has a plurality of crystal grains in its surface has such a shape that an inverted moth-eye structure is superposed over a plurality of raised portions corresponding to an uneven shape that is formed by the plurality of crystal grains in the surface of the aluminum film. Specifically, it was found that, a surface of a moth-eye mold which is fabricated by repeating an anodization step and an etching step with the use of an aluminum film whose average crystal grain diameter is not less than 200 nm and not more than 5 µm has such a shape that an inverted moth-eye structure is superposed over a plurality of raised portions whose average two-dimensional size is not less than 200 nm and not more than 5 µm.

By using a moth-eye mold which has such a shape that an inverted moth-eye structure is superposed over a plurality of raised portions whose average two-dimensional size is not less than 200 nm and not more than 5 µm, an antireflection film which has an uneven structure (macro structure) that performs an antiglare function in addition to the above-described moth-eye structure (micro structure) is obtained. In general, the antiglare function of the antireflection film is evaluated using the haze value. In recent years, there is a tendency that clear images are favored, and therefore, it is particularly preferred that the haze value of the antireflection film is not less than 1% and not more than 5%. As will be described later with experimental examples, it was found that, by using the above-described moth-eye mold which has such a shape that an inverted moth-eye structure is superposed over a plurality of raised portions whose average two-dimensional size is not less than 200 nm and not more than 5 µm, an antireflection film whose haze value is not less than 1% and not more than 5% can be manufactured.

According to the researches conducted by the present inventor, it was found that an antireflection film whose haze value is not less than 1% and not more than 5% can also be manufactured by using a moth-eye mold that is fabricated with the use of an aluminum film in which the distribution of crystal grain diameters has two local maximums, the larger one of which is not less than 200 nm. It was also found that the aluminum film in which the distribution of crystal grain diameters has two local maximums, the larger one of which is, not less than 200 nm, can be formed by setting the thickness of the aluminum film to not less than 0.5 µm and modifying the film formation conditions for the aluminum film.

As will be described later with examples, it was found that, by modifying the average grain diameter or the crystal grain diameter distribution of crystal grains of an aluminum film for use in fabrication of a moth-eye mold, the haze value of an antireflection film which is manufactured using the moth-eye mold can be adjusted.

The present inventor acquired the knowledge that, as described above, the average crystal grain diameter and the crystal grain diameter distribution can be adjusted by modifying the film formation conditions for the aluminum film and that the haze value of an antireflection film manufactured using a moth-eye mold can be adjusted by modifying the average crystal grain diameter or the crystal grain diameter distribution of an aluminum film that is used in fabrication of the moth-eye mold, and reached the concept of the present invention. Hereinafter, the moth-eye mold fabrication method of the embodiment of the present invention is described with reference to FIGS. 1(a) to 1(d).

Firstly, as shown in FIG. 1(a), an aluminum film 18 deposited on a base (here, a glass substrate 16 which is in the form of a flat plate) is provided. The thickness of the aluminum film 18 is not less than 0.5 µm and not more than 5 µm. The surface 18s of the aluminum film 18 has a plurality of crystal grains 18a whose average crystal grain diameter is not less than 200 nm and not more than 5 µm. FIG. 1(a) schematically shows grain boundaries 18b at the surface 18s of the aluminum film 18. The aluminum film 18 which has a thickness of not less than 0.5 µm and not more than 5 µm and which has a plurality of crystal grains 18a whose average crystal grain diameter is not less than 200 nm and not more than 5 µm may be formed using, for example, a vacuum deposition method as will be described later in detail.

Then, the surface 18s of the aluminum film 18 is anodized, whereby a porous alumina layer 14 which has a plurality of minute recessed portions (micropores) 14p is formed as shown in FIG. 1(b). The porous alumina layer 14 includes a porous layer which has the plurality of micropores 14p and a barrier layer formed at the bottoms of the micropores 14p. As shown in FIG. 1(b), the porous alumina layer 14 is formed according to the uneven shape of the surface 18s of the aluminum film 18. Specifically, the surface of the porous alumina layer 14 has a plurality of raised portions corresponding to the plurality of crystal grains 18a of the aluminum film 18. The micropores 14p of the porous alumina layer 14 are formed at positions corresponding to the surface of the crystal grains 18a and the grain boundaries 18b. Specifically, the micropores 14p are formed between the plurality of raised portions and in the surfaces of the plurality of raised portions. The porous alumina layer 14 may be formed by, for example, anodizing the surface 18s in an acidic electrolytic solution. The electrolytic solution used in the step of forming the porous alumina layer 14 may be an aqueous solution which contains, for example, an acid selected from the group consisting of oxalic acid, tartaric acid, phosphoric acid, chromic acid, citric acid, and malic acid. For example, as in Examples 1 to 4 which will be described later, the surface 18s of the aluminum film 18 is anodized with an applied voltage of 80 V for 30 seconds using an oxalic acid aqueous solution (concentration 0.06 wt %, solution temperature 5° C.), whereby the porous alumina layer 14 is formed. By modifying the anodization conditions (e.g., the type of the electrolytic solution and the applied voltage), the micropore interval, the depth of the micropores, etc., can be adjusted. In order to manufacture an antireflection film which provides an excellent antireflection performance, the two-dimensional size of the micropores 14p when viewed in a direction normal to the surface is preferably not less than 50 nm and less than 500 nm. In the moth-eye mold 100A finally obtained, the two-dimensional size and the micropore interval of the micropores 14p are generally equal to each other. Therefore, the anodization step is preferably performed under a condition which leads to a micropore interval of not less than 50 nm and less than 500 nm. Note that the two-dimensional size of the plurality of minute recessed portions 14p when viewed in a direction normal to the surface can be approximately represented by the diameter of a circle.

Then, the porous alumina layer 14 is brought into contact with an alumina etchant such that a predetermined amount is etched away, whereby the pore diameter of the micropores 14p is increased as shown in FIG. 1(c). Here, wet etching may be employed such that the lateral surfaces (or "pore wall") of the micropores 14p and the barrier layer can be generally isotropically etched. By modifying the type and concentration of the etching solution and the etching duration, the etching amount (i.e., the size and depth of the micropores 14p) can be controlled. The etching solution used may be, for example, an aqueous solution of 10 wt % phosphoric acid or organic acid, such as formic acid, acetic acid, citric acid, or the like, or a chromium-phosphoric acid mixture solution. For example, as in Examples 1 to 4 which will be described later, the etching is performed for 25 minutes using phosphoric acid (concentration 1 mol/L, solution temperature 30° C.), whereby the micropores 14p are enlarged.

Then, when necessary, the aluminum film 18 is again partially anodized such that the micropores 14p are grown in the depth direction and the thickness of the porous alumina layer 14 is increased. Here, the growth of the micropores 14p starts at the bottoms of the previously-formed micropores 14p, and accordingly, the lateral surfaces of the micropores 14p have stepped shapes.

Thereafter, when necessary, the porous alumina layer 14 may be brought into contact with an alumina etchant to be etched such that the pore diameter of the micropores 14p is further increased. The etching solution used in this step may preferably be the above-described etching solution. Practically, the same etching solution bath may be used.

In this way, by repeating the anodization step and the etching step, a moth-eye mold 100A (FIG. 1(d)) is obtained. As will be described later with examples, the moth-eye mold 100A has a plurality of raised portions corresponding to the surface shape of the plurality of crystal grains 18a of the aluminum film 18 as a result of formation of the porous alumina layer 14 over the surface 18s of the aluminum film 18. Therefore, the surface of the moth-eye mold 100A has the plurality of minute recessed portions 14p between the plurality of raised portions (portions corresponding to the grain boundaries) and at the surfaces of the plurality of raised portions (portions corresponding to the surfaces of the crystal grains 18a). The reason why the moth-eye mold 100A has such a shape that an inverted moth-eye structure is superposed between the plurality of raised portions corresponding to the uneven shape of the surface 18s of the aluminum film 18 and over the surfaces of the plurality of raised portions can probably be explained below.

As previously described with reference to FIG. 1(b), in the first cycle of the anodization step, the micropores 14p are formed at positions corresponding to the surfaces of the crystal grains 18a and the grain boundaries 18b. Therefore, the surface of the porous alumina layer 14 after the first anodization cycle (FIG. 1(b)) has such a shape that an uneven shape which is formed by the plurality of micropores 14p is superposed over a plurality of raised portions corresponding to the crystal grains 18a at the surface of the aluminum film 18 (FIG. 1(a)). In the subsequent etching cycle, the micropores 14p formed in the first anodization cycle are enlarged. Then, in the subsequent anodization cycle, the growth of the micropores starts at the bottoms of the previously-formed micropores 14p. Thus, the moth-eye mold 100A (FIG. 1(d)) that is obtained by repeating the anodization and the etching has such a shape that an inverted moth-eye structure is superposed over an uneven structure which is formed by a plurality of raised portions corresponding to crystal grains at the surface 18s of the aluminum film 18.

The reason why in the first cycle of the anodization step the micropores 14p are formed in the surfaces of the crystal grains 18a and at positions corresponding to the grain boundaries 18b can probably be explained as follows. According to the researches conducted by the present inventor, it was found that, in the case of forming a porous alumina layer by anodizing a surface of an aluminum base, if there are recessed portions in the surface of the aluminum base, the electric field concentrates at the recessed portions in the surface in the early phase, and accordingly, the growth of micropores preferentially advances in the recessed portions. Therefore, it is inferred that, in the anodization step of the fabrication method of the embodiment of the present invention, in the early phase, the electric field first concentrated at the grain boundaries 18b so that micropores preferentially grew at the grain boundaries 18b. Thereafter, it is inferred that, local electric field concentration also occurred at the surfaces of the crystal grains due to minute recessed and raised portions in the surfaces, for example, and the growth of the micropores 14p advanced. In this way, it is inferred that, the micropores 14p were formed at positions corresponding to the surfaces of the crystal grains 18a and the grain boundaries 18b.

It is inferred that, over the surfaces of the crystal grains 18a, the positions at which the micropores 14p are formed are generally determined depending on the magnitude of the applied voltage. It is generally known that the micropore interval of the porous alumina layer is proportional to the magnitude of the applied voltage for the anodization. Therefore, it is inferred that, over the surfaces of the crystal grains 18a, the micropores 14p are formed at positions that are separated from one another by distance which is determined depending on the applied voltage. For example, it is inferred that, micropores are formed at positions which are separated from the positions corresponding to the grain boundaries 18b where the micropores are formed, by the distance which is determined depending on the applied voltage.

Figure 11:
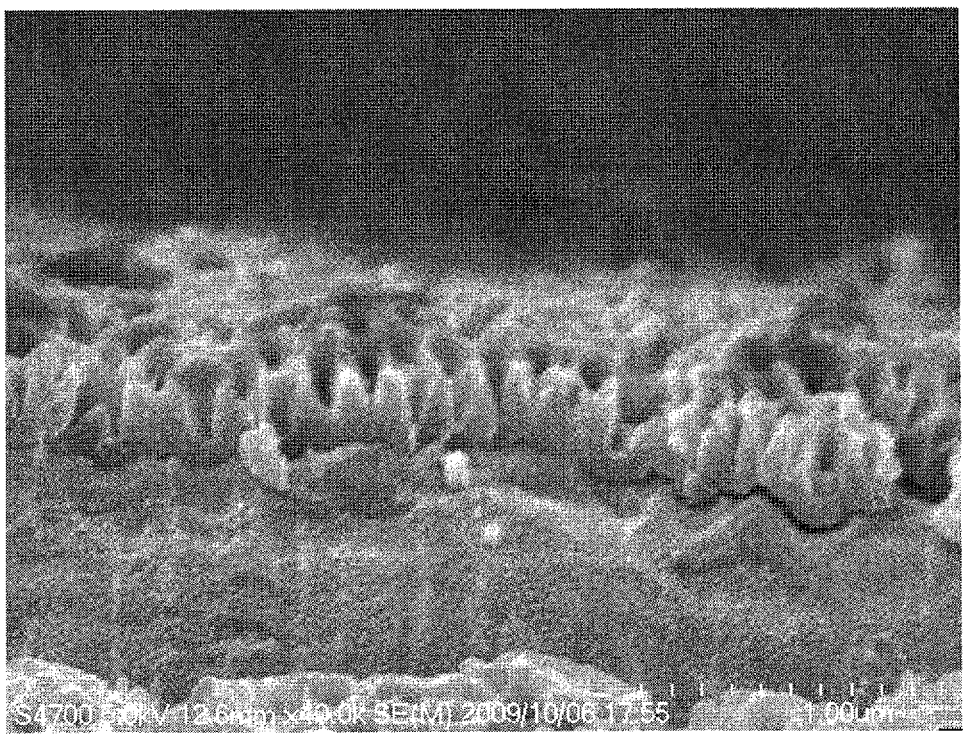
FIGS. 11 (a) and (b) are SEM images of cross sections of the moth-eye molds of Examples 3 and 4, respectively.
Figure 11:
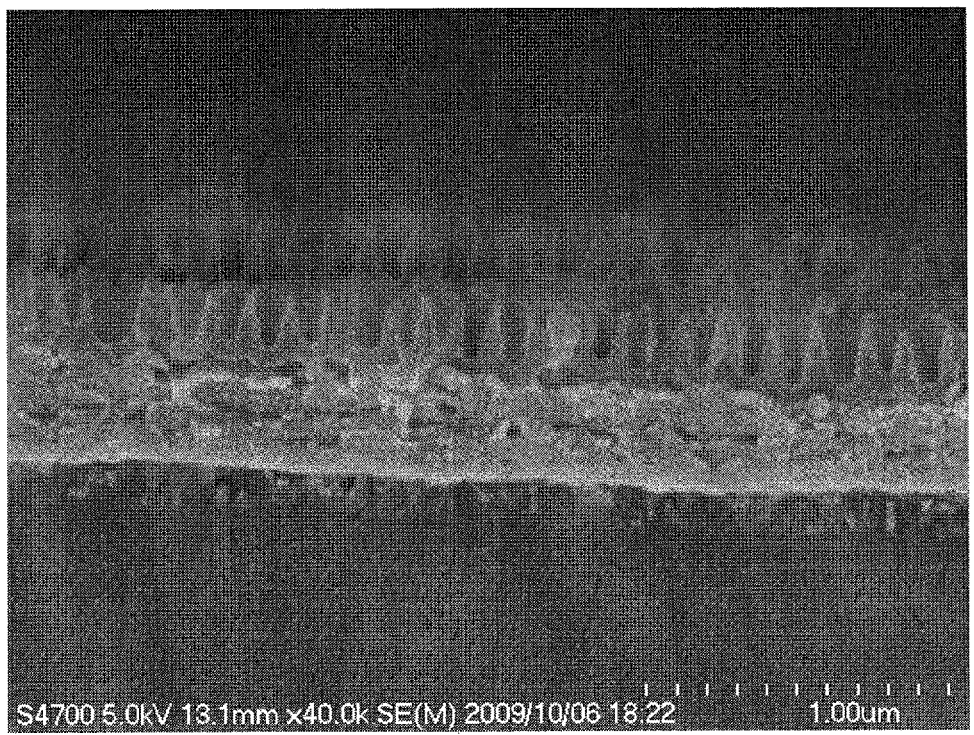

For example, in Example 3 which will be described later, the micropore interval that is determined depending on the applied voltage of 80 V was generally around 200 nm. Therefore, the micropores were formed at the positions corresponding to the grain boundaries and in the surfaces of the crystal grains with the intervals of generally around 200 nm (FIG. 11(a)).

It is inferred that, when the applied voltage has such a magnitude that the micropore interval that is determined depending on the applied voltage is generally equal to the crystal grain diameter, the probability of formation of the micropores 14p in the surfaces of the crystal grains 18a reduces. This is probably because, after the micropores 14p have been formed at the grain boundaries 18b, local electric field concentration is unlikely to occur at positions on the surfaces of the crystal grains 18a which are separated by the distance that is determined depending on the applied voltage from the positions corresponding to the grain boundaries 18b where the micropores 14p have been formed. For example, in Example 1 which will be described later, the micropore interval that is determined depending on the applied voltage of 80 V was generally around 200 nm, and the average crystal grain diameter was about 200 nm. Therefore, it is inferred that large part of the micropores were formed along the grain boundaries.

The moth-eye mold 100A has such a shape that an inverted moth-eye structure is superposed over an uneven structure whose two-dimensional size is not less than 200 nm and not more than 5 μm. Therefore, when an antireflection film is manufactured using the moth-eye mold 100A, the resultant antireflection film has a shape that is inverse of the uneven structure formed in the surface of the moth-eye mold 100A which has the two-dimensional size of not less than 200 nm and not more than 5 μm. This shape can perform an antiglare function as will be described later with examples. Specifically, by using the moth-eye mold 100A, an antireflection film which can perform an antiglare function can be manufactured. As previously described, for example, in a method of fabricating a mold that is for use in manufacture of an antireflection film in which a moth-eye structure is superposed over an antiglare structure such as disclosed in aforementioned Patent Documents 1, 2 and 4, it is necessary to perform the step of forming an uneven structure that is for formation of the antiglare structure, independently of the step of forming an inverted moth-eye structure. According to the moth-eye mold fabrication method of the embodiment of the present invention, an aluminum film is used in which an uneven structure that is for formation of an antiglare structure is formed in the step of depositing the aluminum film, and thus, a moth-eye mold that is for manufacture of an antireflection film in which a moth-eye structure is superposed over an antiglare structure can readily be fabricated without independently performing the step of forming an uneven structure that is for formation of the antiglare structure.

In order to manufacture an antireflection film which provides an excellent antireflection performance, it is preferred that the two-dimensional size of the micropores 14p when viewed in a direction normal to the surface is not less than 50 nm and less that 500 nm. The shape and the size of the micropores 14p can be changed by modifying, for example, the conditions and the number of cycles of the anodization and/or the conditions and the number of cycles of the etching.

As previously described, in the moth-eye mold 100A, the two-dimensional size and the micropore interval of the micropores 14p are generally equal to each other. In general, the micropore interval is generally proportional to the magnitude of the applied voltage. Thus, in order to form micropores whose two-dimensional size is not less than 50 nm and less than 500 nm, a voltage may be applied such that micropores are formed with a micropore interval of not less than 50 nm and less than 500 nm.

Now, a method of forming the aluminum film 18 is described. The present inventor found that, by modifying the film formation conditions in forming an aluminum film which has a thickness of not less than 0.5 μm, an aluminum film can be formed which has a plurality of crystal grains in its surface, whose average crystal grain diameter is not less than 200 nm and not more than 5 μm. Note that, from the viewpoint of productivity, the thickness of the aluminum film is preferably not more than 5 μm. As will be described later with examples, an aluminum film which has a plurality of crystal grains in its surface, whose average crystal grain diameter is not less than 200 nm and not more than 5 µm, can be formed by, for example, sputtering or electron beam deposition.

For example, as in Example 1 which will be described later, by performing five cycles of the step of forming a 200 nm thick aluminum layer by sputtering, an aluminum film can be formed in which the average crystal grain diameter of a plurality of crystal grains is 200 nm. As in Example 3, by performing ten cycles of the step of forming a 420 nm thick aluminum layer by sputtering, an aluminum film can be formed in which the average crystal grain diameter of a plurality of crystal grains is 700 nm.

In this way, the average crystal grain diameter can be controlled by modifying the film formation conditions for the aluminum film and the thickness of the aluminum film. Also, the average crystal grain diameter can be controlled by modifying a factor other than the aluminum film thickness, such as the temperature of the substrate or the thickness of the substrate, for example.

In the example which has been described above, the aluminum film 18 that is formed on the glass substrate 16 in the form of a flat plate is used. However, the surface form of the base on which an aluminum film is to be formed may be a curved surface or a roll surface, for example. The material of the base may be an acid-resistant insulating material, such as a ceramic or plastic material, for example. Alternatively, for example, a bulk of an aluminum material may be used as the base. Still alternatively, for example, an insulating material provided over a bulk of a non-aluminum metal material may be used as the base.

Now, a method of manufacturing an antireflection film according to an embodiment of the present invention is described with reference to FIG. 2.

Figure 2:
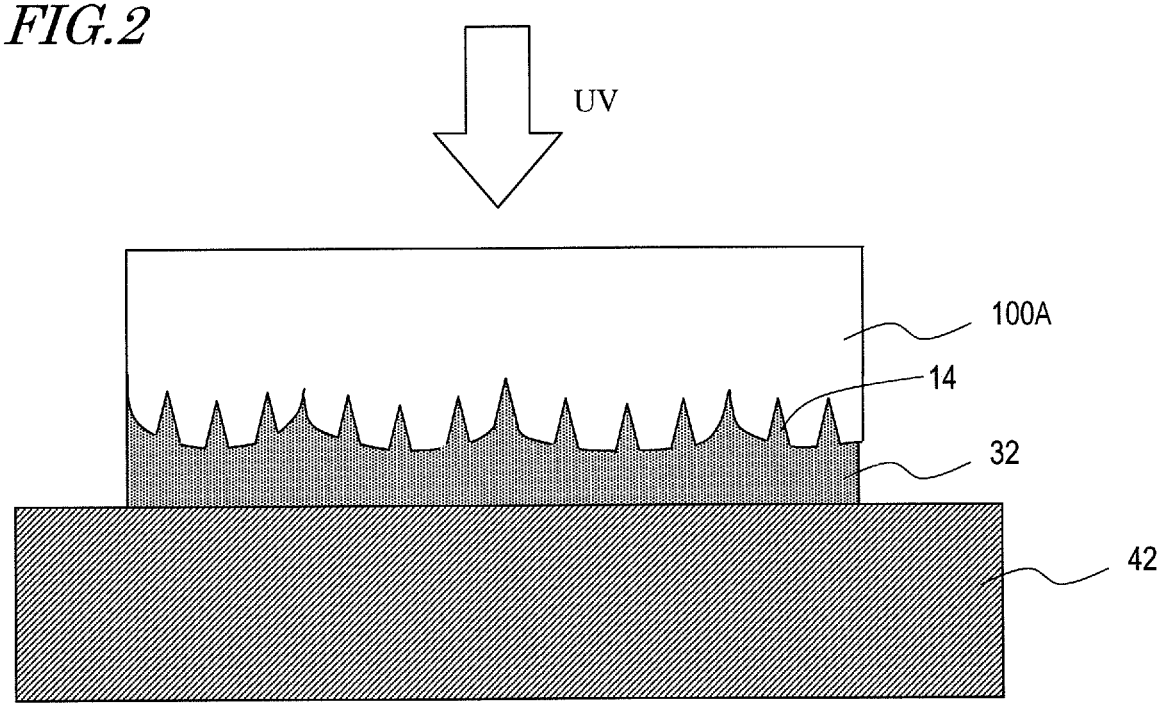
FIG. 2 A schematic cross-sectional view for illustrating the process of manufacturing an antireflection film with the use of a moth-eye mold 100A.

Firstly, as shown in FIG. 2, the moth-eye mold 100A is provided.

Then, a UV-curable resin 32, which is provided between a surface of a work 42 and the moth-eye mold 100A, is irradiated with ultraviolet (UV) light through the moth-eye mold 100A such that the UV-curable resin 32 is cured. The UV-curable resin 32 may be provided over the surface of the work 42 or may be provided over a mold surface of the moth-eye mold 100A (a surface of the mold which has the moth-eye, structure). The UV-curable resin used may be, for example, an acrylic resin.

Thereafter, the moth-eye mold 100A is separated from the work 42, whereby a cured material layer of the UV-curable resin 32, to which the uneven structure of the moth-eye mold 100A (a structure where the inverted moth-eye structure is superposed over an uneven structure that is formed by a plurality of raised portions) is transferred, is formed over the surface of the work 42. In this way, an antireflection film is obtained wherein a moth-eye structure is superposed over an uneven structure that is inverse of an uneven structure formed by a plurality of raised portions whose average two-dimensional size is not less than 200 nm and not more than 5 µm. In other words, an antireflection film is obtained wherein a moth-eye structure is superposed over an uneven structure whose average two-dimensional size is not less than 200 nm and not more than 5 µm and which performs an antiglare function.

The antireflection film manufactured using the moth-eye mold 100A has an uneven structure which performs an antiglare function, and the average two-dimensional size of the uneven structure is not less than 200 nm and not more than 5 µm. Thus, this antireflection film has the advantages which will be described below.

According to the researches conducted by the present inventor, it was found that, when the size of the uneven shape of the viewer side surface of a member provided at the viewer side of the display panel is 50% to 200% of the pixel size, the surface is in a state as if a lens was provided in each pixel. As a result, the difference in brightness and darkness among pixels is visually perceived, so that a viewer may sense a discontinuity. It is inferred that this problem can be avoided by making the size of the recessed and raised portions at the surface sufficiently smaller than the pixel size. The pixel size of liquid crystal display panels which are commonly used nowadays is generally 50 µm to 700 µm. The average two-dimensional size of the uneven structure of the surface of an antireflection film which is manufactured using the moth-eye mold 100A of the embodiment of the present invention is not less than 200 nm and not more than 5 µm, which is sufficiently smaller than the pixel size. Thus, the antireflection film that is manufactured using the moth-eye mold 100A can prevent a viewer from sensing a discontinuity such as described above.

The aluminum film 18 used in the above example has an average crystal grain diameter of not less than 200 nm and not more than 5 µm. The aluminum film used may be an aluminum film whose crystal grain diameter distribution has two local maximums. Specifically, the aluminum film used may be an aluminum film which includes a plurality of crystal grains with a relatively small crystal grain diameter and a plurality of crystal grains with a relatively large crystal grain diameter. A moth-eye mold which is fabricated using an aluminum film whose crystal grain diameter distribution has two local maximums has such a shape that an inverted moth-eye structure is superposed over an uneven structure that is formed by a plurality of raised portions whose two-dimensional size distribution has two local maximums according to the same mechanism as that described above. As will be described later with examples, an antireflection film that is manufactured using this mold according to the method which has previously been described with reference to FIG. 2 has a higher haze value than an antireflection film that is manufactured using a moth-eye mold which is fabricated using an aluminum film whose crystal grain diameter distribution has one local maximum.

The aluminum film whose crystal grain diameter distribution has two local maximums may be formed as described below. For example, as in Example 4 which will be described later, an aluminum material is continuously deposited to 1 µm thick by electron beam deposition, whereby an aluminum film can be formed whose crystal grain diameter distribution has two local maximums of 150 nm and 200 nm. As in Example 2, three cycles of the step of forming a 420 nm thick aluminum layer by sputtering are performed, whereby an aluminum film can be formed whose crystal grain diameter distribution has two local maximums of 200 nm and 400 nm. In this way, by modifying the film formation conditions for the aluminum film and the thickness of the aluminum film, the crystal grain diameter distribution can be controlled. Alternatively, the crystal grain diameter distribution can also be adjusted by modifying a factor other than the aluminum film thickness, such as the substrate temperature or the substrate thickness, for example.

A moth-eye mold that is fabricated using an aluminum, film that contains crystal grains, 5% or more of which has a grain diameter of greater than $R1-\{(R1-R2)/2\}$ where the crystal grain diameter distribution of the crystal grains has two local maximums, the larger one of which is R1, and the smaller one is R2, has such a shape that an inverted moth-eye structure is superposed over a plurality of raised portions, 5% or more of which has a two-dimensional size of greater than L1−{(L1−L2)/2} where the two-dimensional size distribution of the raised portions has two local maximums, the larger one of which is L1, and the smaller one is L2. By using the moth-eye mold which has such a shape that an inverted moth-eye structure is superposed over a plurality of raised portions, 5% or more of which has a two-dimensional size of greater than L1−{(L1−L2)/2}, an antireflection film can be manufactured which has a haze value of not less than 1% and not more than 5%.

For example, in an aluminum film of Example 2 which will be described later, R1=400 nm and R2=200 nm. The aluminum film includes crystal grains, 5.96% of which has a grain diameter of greater than R1−{(R1−R2)/2}=300 nm. In an aluminum film of Example 4, R1=200 nm and R2=150 nm. The aluminum film includes crystal grains, 7.59% of which has a grain diameter of greater than R1−{(R1−R2)/2}=175 nm. The moth-eye molds of Example 2 and Example 4 enable manufacture of antireflection films whose haze values are 1.7% and 1.3%, respectively.

The haze value of the antireflection film may vary depending on the breadth of the crystal grain diameter distribution of the crystal grains of the aluminum film. By using a moth-eye mold that is fabricated using an aluminum film which has a wide crystal grain diameter distribution, an antireflection film can be manufactured which is preferred from the viewpoint of the haze value. As in Examples 2, 3 and 4 which will be described later, by using a moth-eye mold which is fabricated using an aluminum film whose crystal grain diameter distribution is wider than a range of ±50 nm from the average crystal grain diameter, an antireflection film can be obtained which has a haze value of not less than 1%.

Hereinafter, a mold and a mold fabrication method according to an embodiment of the present invention are described in more detail with reference to specific examples illustrated below.

Examples 1 to 4

Examples 1 to 4 are different from one another in terms of the thickness of the aluminum film and/or the crystal grain diameter distribution of crystal grains at the surface.

In Examples 1 to 4, in the beginning, an aluminum film was formed using a glass substrate (360 mm×460 mm, 2.8 mm thick) which was sufficiently smoothed so as to have a specular surface. The aluminum films of Examples 1 to 3 were formed by sputtering. The aluminum film of Example 4 was formed by electron beam deposition.

The crystal grain diameter was measured from the surface SEM images of the aluminum films, and the average crystal grain diameter was calculated. Note that the crystal grain diameter measured was the two-dimensional size of the crystal grains in the surface SEM images of the aluminum films when viewed in a direction normal to the surface. Also, the crystal grain diameter distribution of the crystal grains of the aluminum films was examined. Also, the n-point average roughness Rz of the surfaces of the aluminum films was obtained by means of AFM measurement using the atomic force microscope (AFM) of Multi-Function Unit SPA-400 and Probe Station SPI3800N manufactured by Seiko Instruments Inc. For Examples 1, 2 and 4, the ten-point average roughness Rz (n=10) was examined. Here, the ten-point average roughness Rz refers to the ten-point average roughness Rz of JIS-B0601:1994. For Example 3, the n-point average roughness (n=6) was examined.

To examine the light scatterability of the aluminum film, the 5-degree specular reflectance of the surfaces of the aluminum films of Examples 1 to 4 was measured. Light was supplied traveling toward the surface of the aluminum film in a direction inclined by 5° from the normal to the surface of the aluminum film, and the intensity of reflected light outgoing in the specular reflection direction was measured using UV/Vis Spectrophotometer V-560 and Absolute Reflectance Meter ARV-474 manufactured by JASCO Corporation. The measured wavelength range was from 380 nm to 780 nm.

The fabrication process which has previously been described with reference to FIGS. 1(a) to 1(d) was performed using the aluminum films. The anodization conditions were such that the treatment solution was oxalic acid (concentration: 0.06 wt %), the temperature was 5° C., the voltage was 80 V, and the duration was 30 sec. The etching conditions were such that the treatment solution was phosphoric acid (concentration: 1 mol/L), the treatment temperature was 30° C., and the duration was 25 min. The anodization step and the etching step were alternately performed through five cycles (including five anodization cycles and four etching cycles).

The resultant moth-eye molds were used to manufacture antireflection films according to the method which has previously been described with reference to FIG. 2. The work 42 used was a TAC film provided with an acrylic hard coat treatment. The UV-curable resin 32, which was an acrylic UV-curable resin, was provided between the surface of the TAC film and the mold that was coated with a fluoric mold release agent, and irradiated with ultraviolet light supplied through the mold. After the UV-curable resin 32 was sufficiently cured, the moth-eye mold 100A was separated from the TAC film.

The integrating sphere reflectance and the haze value of the antireflection films were measured. The integrating sphere reflectance was measured using Spectrocolorimeter CM-2002 manufactured by Minolta Co., Ltd. Incoming diffused light was received from the direction of polar angle 8°. The integrating sphere reflectance discussed herein was a relative value of a measured integrating sphere reflectance relative to the integrating sphere reflectance of the standard white calibration plate which is assumed as being 100. The haze value was measured using Integrating Sphere Haze Meter NDH-2000 manufactured by NIPPON DENSHOKU INDUSTRIES CO., LTD. The projected light was collimated light. The sum of the straight transmission light and the diffused transmission light was assumed as the total transmission light. The ratio of the diffused transmission light to the total transmission light was assumed as the haze value.

Hereinafter, the method of forming the aluminum films of Examples 1 to 4 is first described.

In Example 1, the process was interrupted at the timing when an aluminum layer was deposited by sputtering to 200 nm along the thickness direction, and after passage of a certain period of time, the deposition was resumed. This cycle was repeated five times, whereby an aluminum film having a total thickness of 1 μm was formed. If the aluminum film was formed by continuous deposition, a void (empty space) might be formed inside the aluminum film. If an aluminum film including a void was etched, a pore with a greater two-dimensional size than the micropores of the porous alumina layer might disadvantageously be formed because a portion of the aluminum film including the void might have a different film quality and, accordingly, the dissolution speed might be relatively fast at the void portion. Therefore, in Example 1, the aluminum film was formed through a plurality of separate cycles.

In Example 2, the process was interrupted at the timing when an aluminum layer was deposited by sputtering to 420 nm along the thickness direction, and after passage of a certain period of time, the deposition was resumed. This cycle was repeated three times, whereby an aluminum film having a total thickness of 1.26 μm was formed.

In Example 3, the process was interrupted at the timing when an aluminum layer was deposited by sputtering to 420 nm along the thickness direction, and after passage of a certain period of time, the deposition was resumed. This cycle was repeated ten times, whereby an aluminum film having a total thickness of 4.2 μm was formed.

In Example 4, the aluminum film was formed by electron beam deposition without interruption till the thickness reached 1 μm.

The SEM images of the surfaces of the aluminum films of Examples 1, 2, 3 and 4 are shown in FIG. 3(a), FIG. 3(b), FIG. 4(a) and FIG. 4(b), respectively. Table 1 shows the film thickness, and the maximum, minimum, and average of the crystal grain diameter of the aluminum films of Examples 1, 2, 3 and 4. Note that the crystal grain diameter distribution of the crystal grains of the aluminum films of Examples 1 and 3 had one local maximum, and the crystal grain diameter distribution of the crystal grains of the aluminum films of Examples 2 and 4 had two local maximums. Table 1 also shows the two local maximums of the crystal grain diameter distribution of Examples 2 and 4.

In the aluminum film of Example 1, the maximum of the crystal grain diameter at the surface (the crystal grain diameter obtained from the surface SEM image) was 250 nm. The minimum of the crystal grain diameter was 150 nm. The average crystal grain diameter was 200 nm. The average crystal grain diameter was the average of the measured crystal grain diameters of the crystal grains in the region of the SEM image (FIG. 3(a)).

Figure 3:
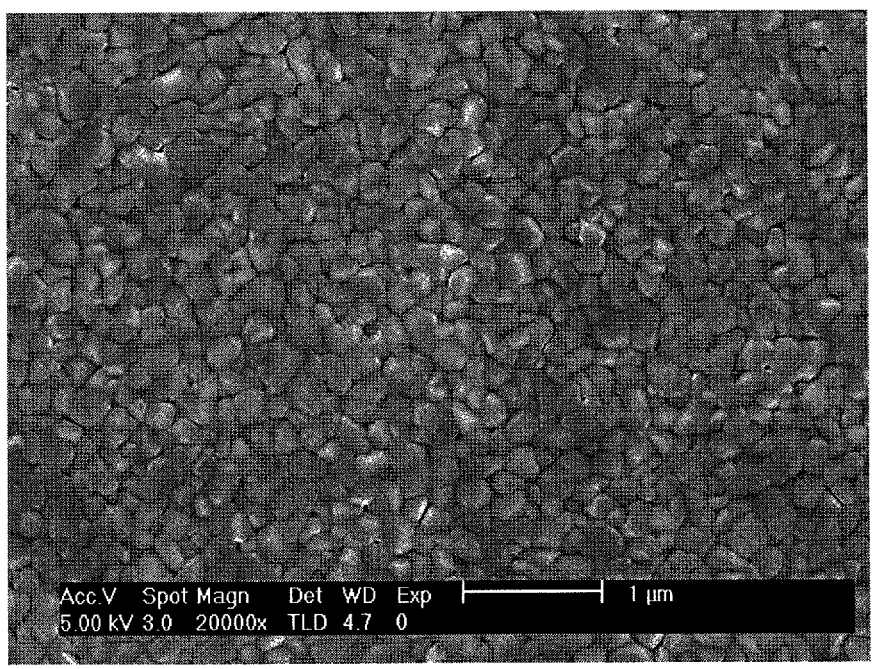
FIGS. 3 (a) and (b) are SEM images of surfaces of aluminum films of Examples 1 and 2, respectively.
Figure 3:
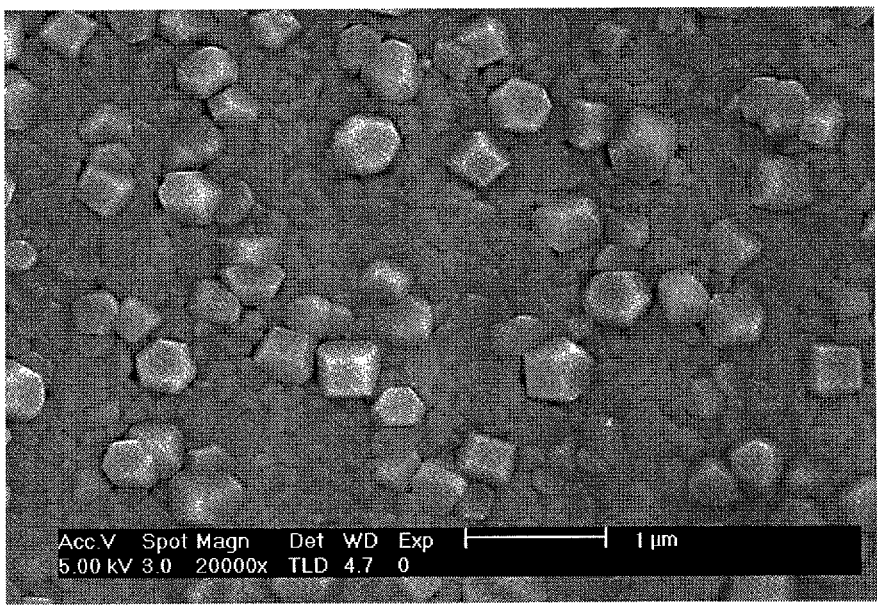

As shown in FIG. 3(b), the surface of the aluminum film of Example 2 has large-size crystal grains as compared with the aluminum film of Example 1. The maximum of the size of the crystal grains (crystal grain diameter) was 600 nm, and the minimum of the crystal grain size was 150 nm. The average crystal grain diameter was 215 nm. The crystal grain diameter distribution had two local maximums. The larger local maximum R1 was 400 nm, and the smaller local maximum R2 was 200 nm. The number density of crystal grains whose grain diameter was greater than R1−{(R1−R2)/2}=300 nm was 1.9 counts/μm². 5.96% of the plurality of crystal grains had a grain diameter of greater than 300 nm.

Figure 4:
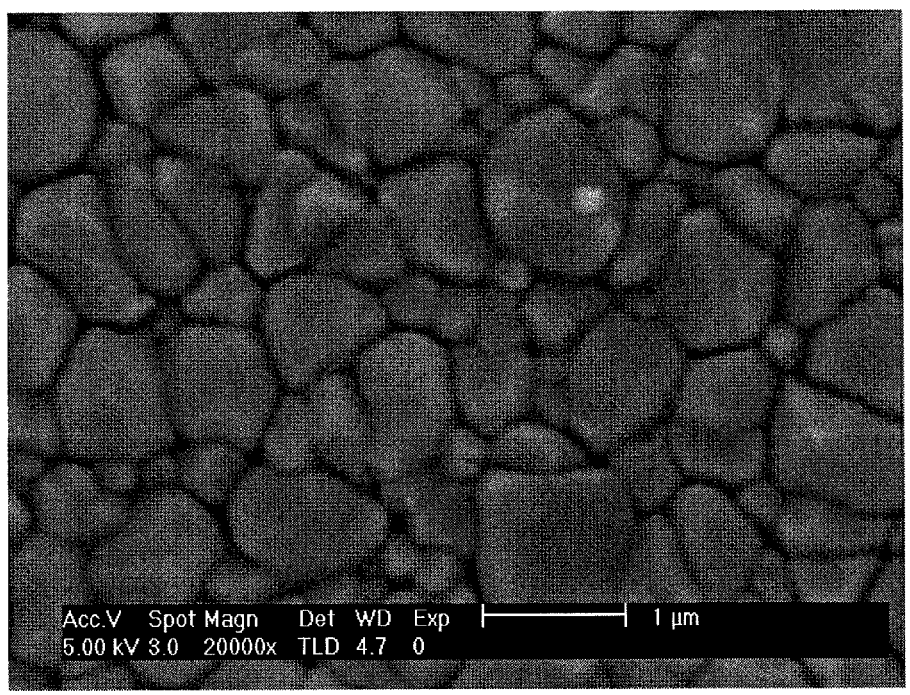
FIGS. 4 (a) and (b) are SEM images of surfaces of aluminum films of Examples 3 and 4, respectively.
Figure 4:
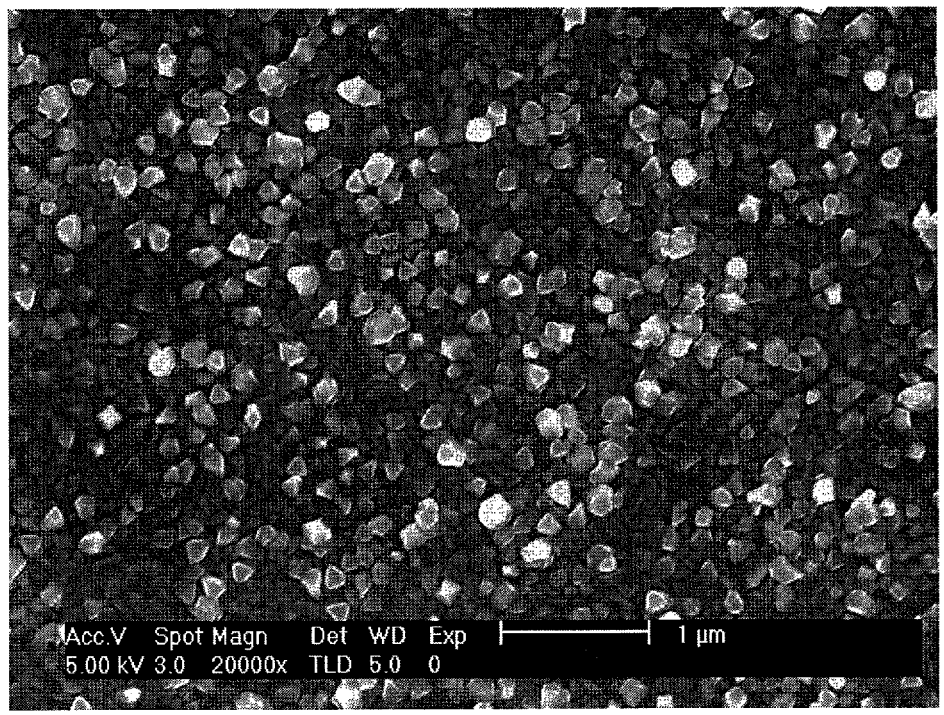
Figure 5:
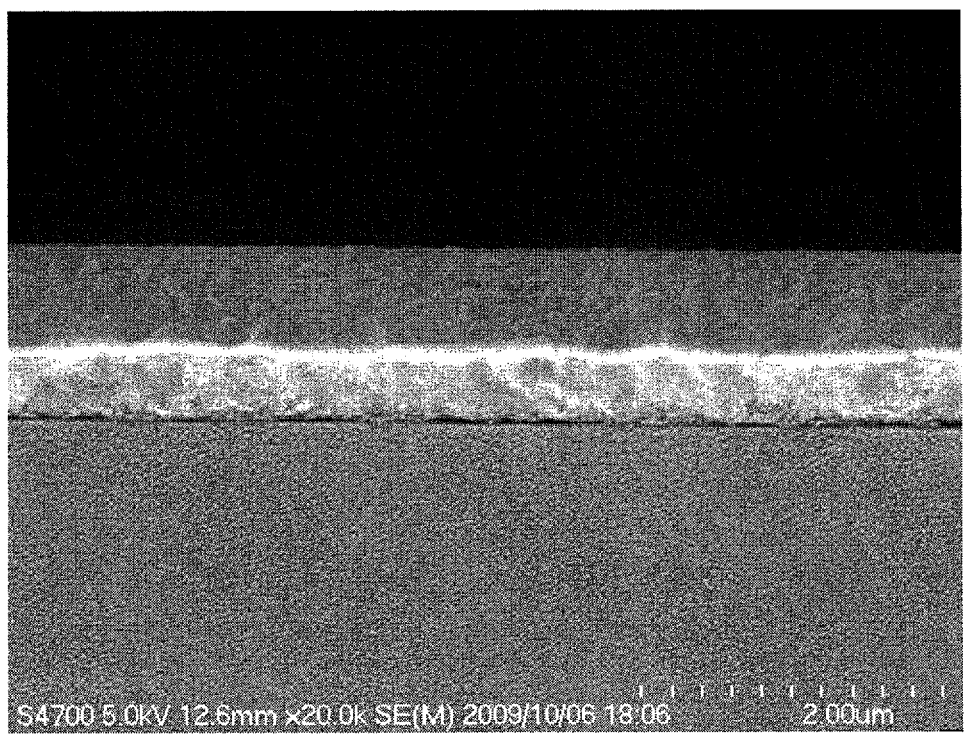
FIGS. 5 (a) and (b) are SEM images of cross sections of the aluminum films of Examples 1 and 2, respectively.
Figure 5:
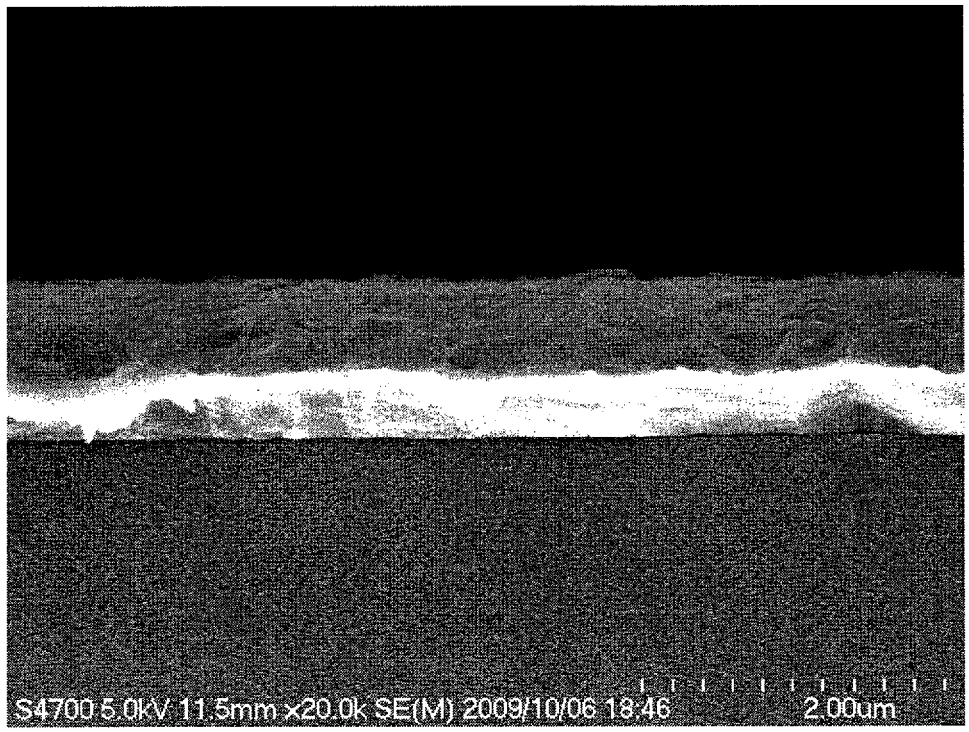
Figure 6:
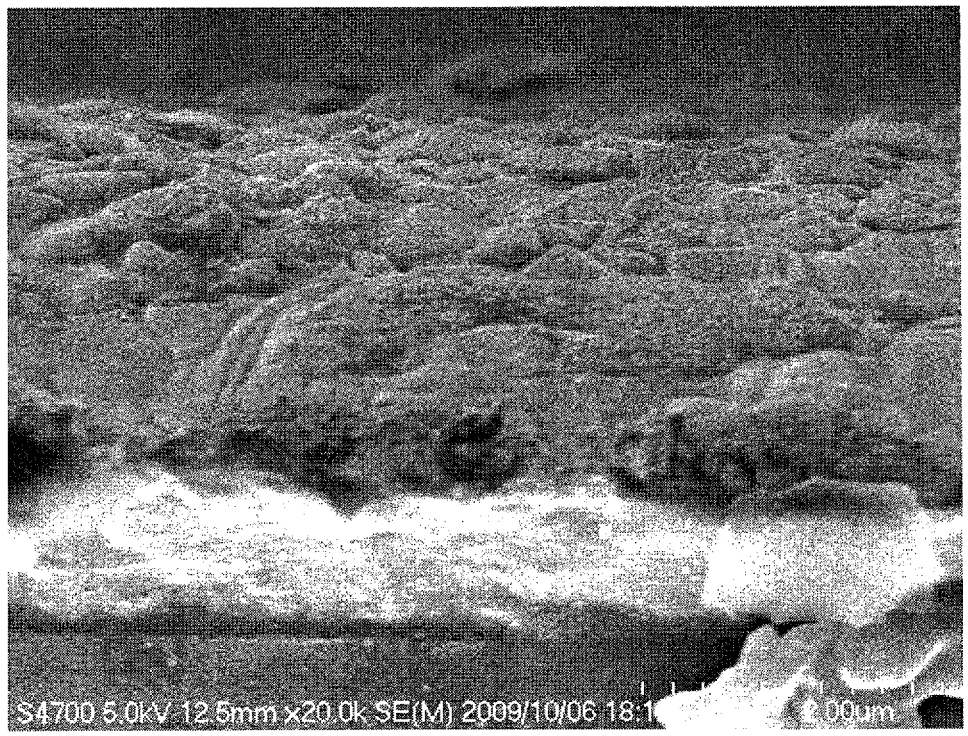
FIGS. 6 (a) and (b) are SEM images of cross sections of the aluminum films of Examples 3 and 4, respectively.
Figure 6:
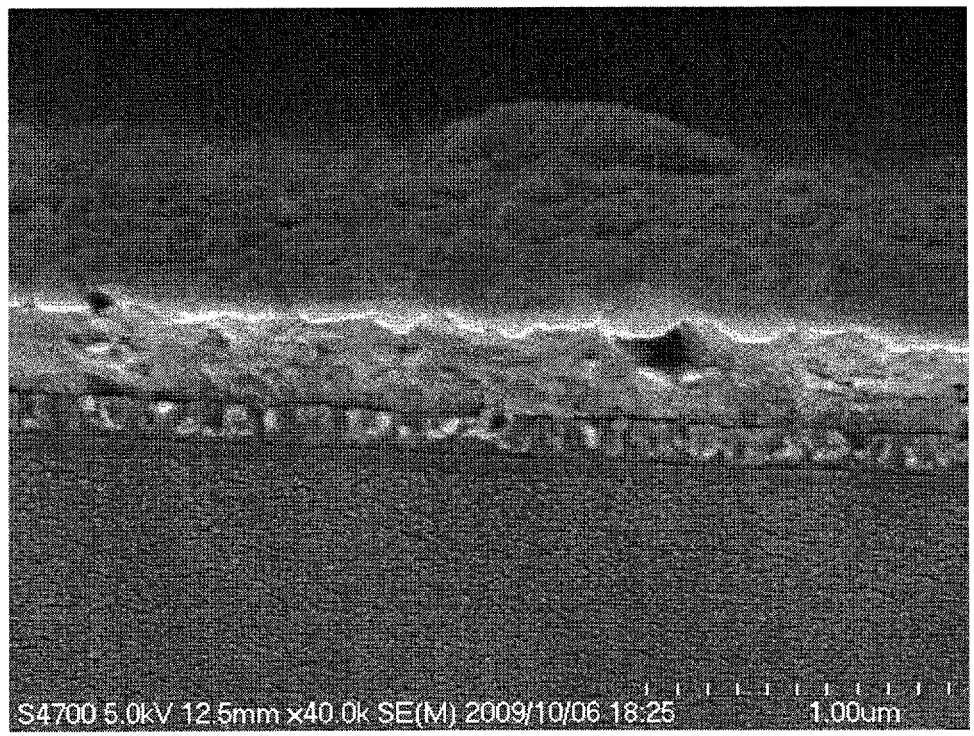

As shown in FIG. 4(a), the crystal grains at the surface of the aluminum film of Example 3 were large as compared with the aluminum films of Example 1 and Example 2. The maximum crystal grain diameter was 1200 nm, and the minimum crystal grain diameter was 200 nm. The average crystal grain diameter was 700 nm.

The maximum grain diameter of the crystal grains at the surface of the aluminum film of Example 4 (FIG. 4(b)) was 240 nm, and the minimum grain diameter was 100 nm. The average crystal grain diameter was 160 nm. The crystal grain diameter distribution had two local maximums. The larger local maximum was 200 nm, and the smaller local maximum was 150 nm. The number density of crystal grains whose grain diameter was greater than R1−{(R1−R2)/2}=175 nm was 4.3 counts/μm². 7.59% of the plurality of crystal grains had a grain diameter of greater than 175 nm.

Thus, in Example 2 and Example 4, 5% or more of the plurality of crystal grains at the surface of the aluminum film had a grain diameter of greater than R1−{(R1−R2)/2}.

As seen from Table 1, in Examples 2, 3 and 4, the crystal grain diameter distribution of the crystal grains of the aluminum film was wider than the range of ±50 nm from the average crystal grain diameter.

FIG. 5(a), FIG. 5(b), FIG. 6(a) and FIG. 6(b) show SEM images of cross-sections of the aluminum films of Examples 1, 2, 3 and 4, respectively. The uneven shape of the surface of the aluminum film of Example 3 (FIG. 6(a)) had large undulations as compared with Example 1 (FIG. 5(a)), Example 2 (FIG. 5(b)) and Example 4 (FIG. 6(b)).

The ten-point average roughnesses of the aluminum films of Examples 1, 2 and 4 were 40.29 nm, 121.6 nm and 104.8 nm, respectively. The n-point average roughness (n=6) of the surface of the aluminum film of Example 3 was 230.6 nm. Table 1 shows the n-point average roughness of the surface of the aluminum films of Examples 1, 2, 3 and 4. The n-point average roughness Rz was larger in order of Examples 3, 2, 4 and 1. Thus, as for the n-point average roughnesses of Examples 1 to 4, the relationship of Example 3>Example 2>Example 4>Example 1 held true. Therefore, there was a tendency that the size along the thickness direction of the uneven structure formed by a plurality of crystal grains was larger in order of Examples 3, 2, 4 and 1. In Examples 2, 3 and 4, the n-point average roughness Rz was not less than 100 nm.

It is inferred that, as described above, the antiglare property of the antireflection film is affected not only by the two-dimensional size of the uneven structure of the surface but also by the size along the thickness direction of the uneven structure. Therefore, it is inferred that the antiglare property of an antireflection film which is manufactured using a moth-eye mold is also affected by the size along the thickness direction of a plurality of raised portions corresponding to a plurality of crystal grains residing at the surface of the moth-eye mold. Thus, the antiglare property of the antireflection film may vary depending on the size along the thickness direction of the uneven structure formed by crystal grains of an aluminum film that is used in fabrication of the mold. As will be described later, it is inferred that the higher haze values of the antireflection films of Examples 2, 3 and 4 than Example 1 (by 1% or more) were attributed to the fact that the size along the thickness direction of the uneven structure formed by crystal grains residing at the surface of the aluminum films of Examples 2, 3 and 4 was large.

TABLE 1

| Example | 1 | 2 | 3 | 4 |
|---|---|---|---|---|
| Thickness of aluminum film (μm) | 1.0 | 1.26 | 4.2 | 1.0 |
| Maximum value of crystal grain diameter (nm) | 250 | 600 | 1200 | 240 |
| Minimum value of crystal grain diameter (nm) | 150 | 150 | 200 | 100 |
| Average crystal grain diameter (nm) | 200 | 215 | 700 | 160 |
| Local maximum of larger crystal grain diameter distribution (nm) | — | 400 | — | 200 |
| Local maximum of smaller crystal grain diameter distribution (nm) | — | 200 | — | 150 |
| n-point average roughness Rz (nm) | 40.29 | 121.6 | 230.6 | 104.8 |

Figure 7:
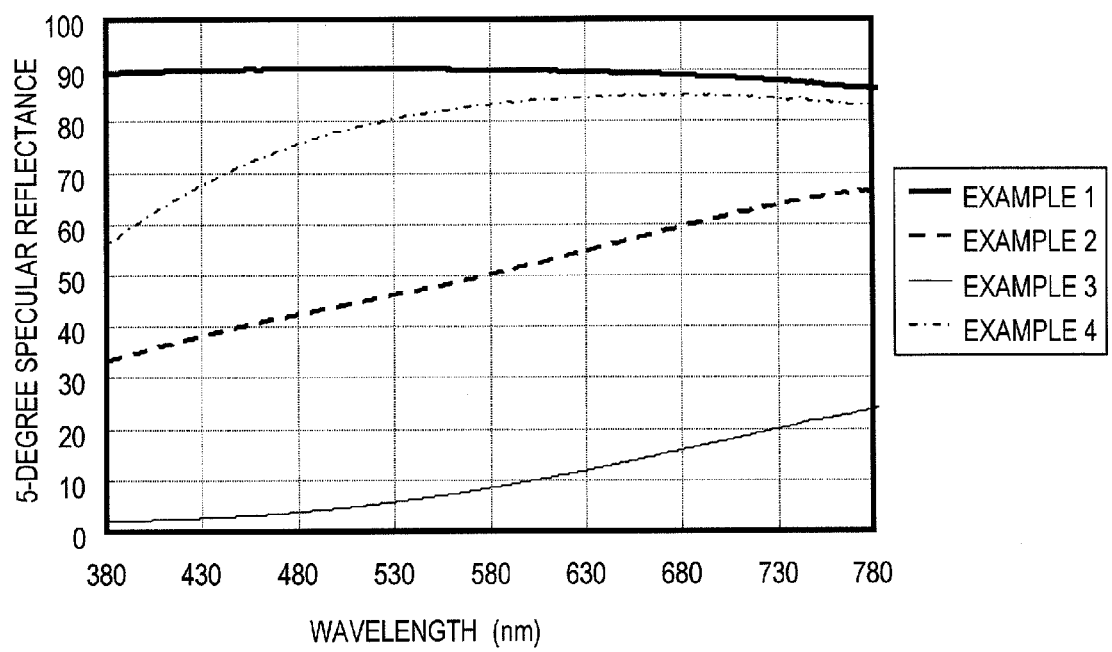
FIG. 7 A graph which shows the 5-degree specular reflectance of the aluminum films of Examples 1 to 4.
Figure 8:
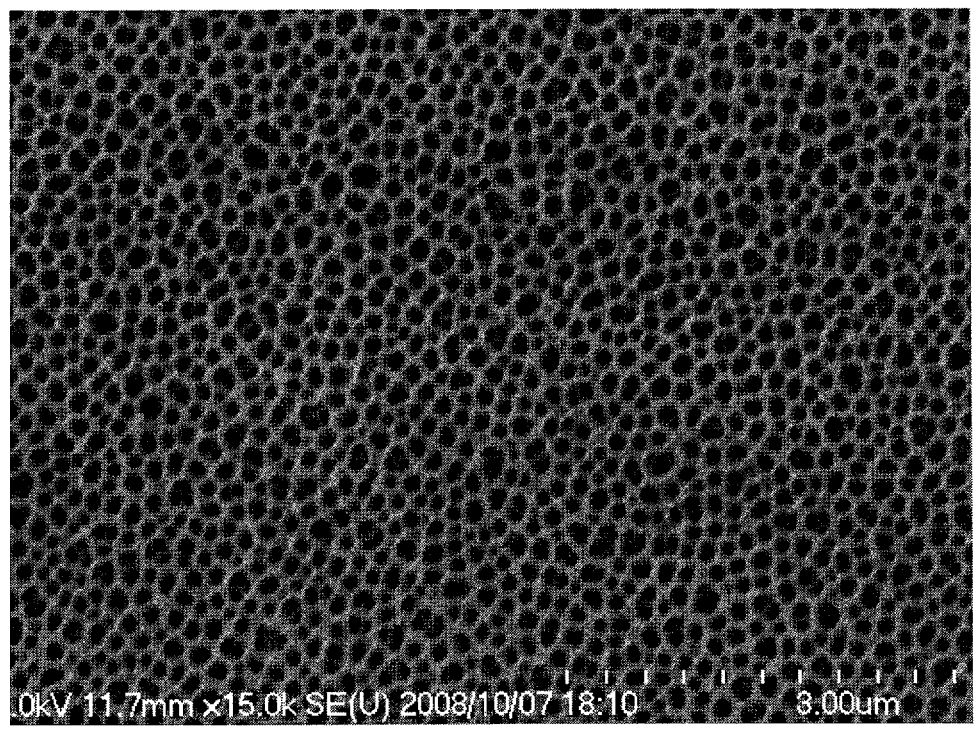
FIGS. 8 (a) and (b) are SEM images of surfaces of moth-eye molds of Examples 1 and 2, respectively.
Figure 8:
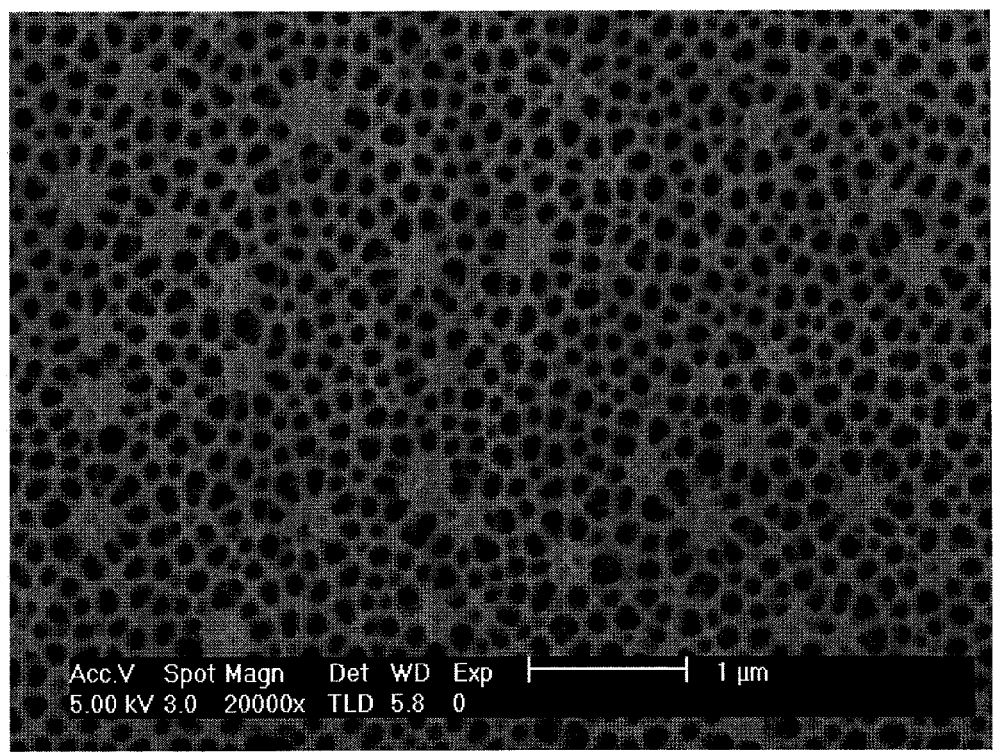
Figure 9:
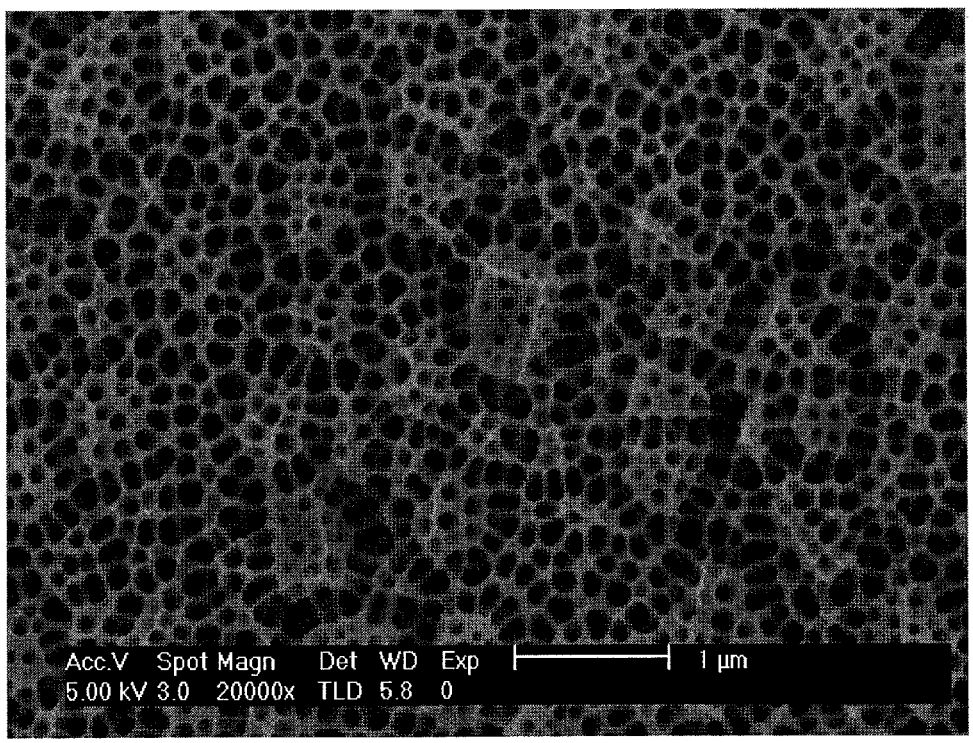
FIGS. 9 (a) and (b) are SEM images of surfaces of moth-eye molds of Examples 3 and 4, respectively.
Figure 9:
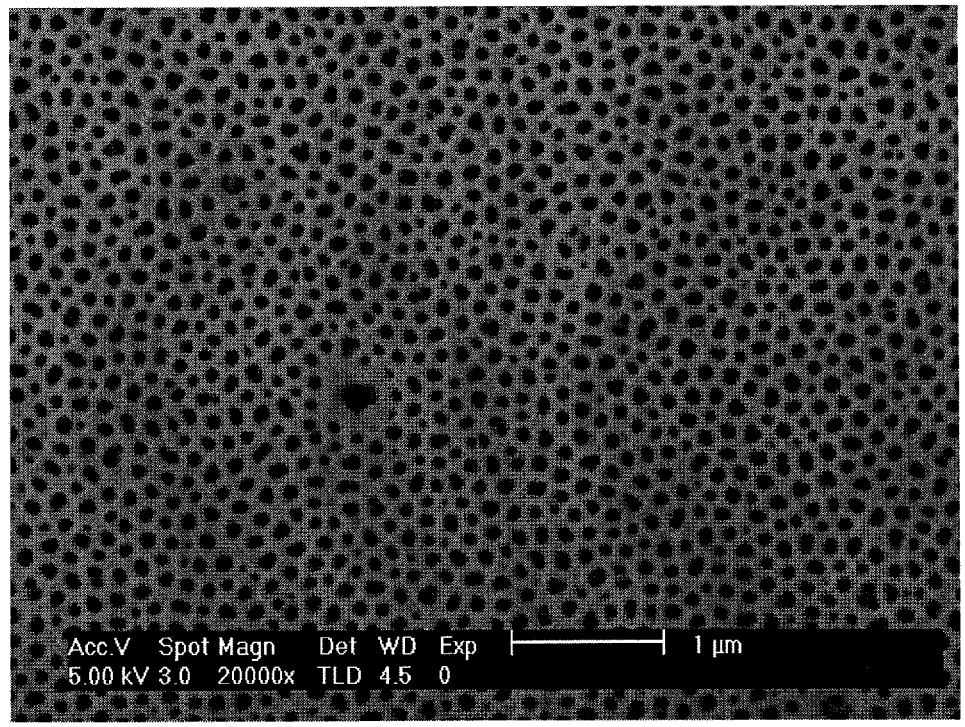
Figure 10:
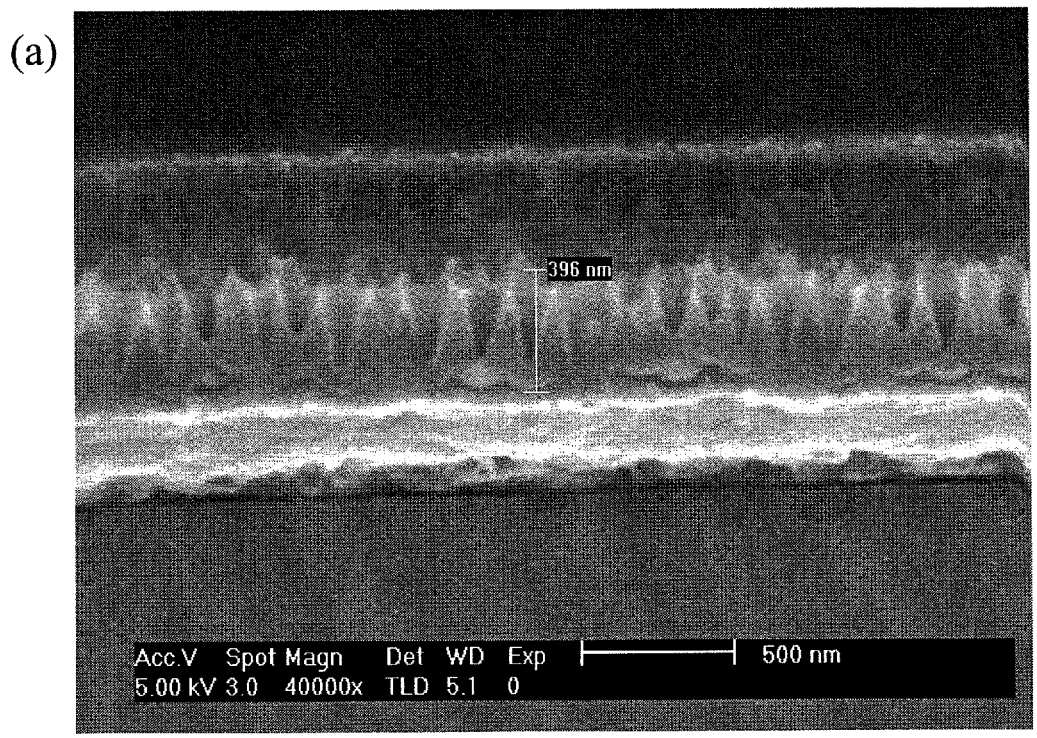
FIGS. 10 (a) and (b) are SEM images of cross sections of the moth-eye molds of Examples 1 and 2, respectively.
Figure 10:

FIG. 7 shows the reflectance (5-degree specular reflectance) of the aluminum films of Examples 1, 2, 3 and 4 for the measurement wavelength by the bold solid line, broken line, thin solid line, and chain-dot line, respectively. As seen from FIG. 7, over the entire wavelength range, the reflectance was lower in order of Examples 3, 2, 4 and 1. Thus, over the entire wavelength range, as for the reflectances of Examples 1 to 4, the relationship of Example 3<Example 2<Example 4<Example 1 held true. It is inferred that, when the intensity in the specular reflection direction of the reflection of light incoming in a direction inclined by 5° from the normal direction is measured, an aluminum film which has higher scatterability exhibits lower reflectance. Therefore, it is inferred from the results of FIG. 7 that the scatterability was higher in order of Examples 3, 2, 4 and 1. Thus, it is inferred that, as for the scatterability, the relationship of Example 3>Example 2>Example 4>Example 1 held true. Also, there was a tendency that the reflectance increased as the average crystal grain diameter increased.

Now, the moth-eye molds of Examples 1 to 4 are described.

The SEM images of the surfaces of the moth-eye molds of Examples 1, 2, 3 and 4 are shown in FIG. 8(a), FIG. 8(b), FIG. 9(a) and FIG. 9(b), respectively. The moth-eye mold of Example 1 (FIG. 8(a)) had micropores which were formed generally uniformly over the entire surface. On the other hand, in the moth-eye mold of Example 2 (FIG. 8(b)) and the moth-eye mold of Example 3 (FIG. 9(a)), the mold surface had a portion where no micropore was formed, and the distribution of the micropores was nonuniform as compared with Example 1. In the moth-eye mold of Example 4 (FIG. 9(b)), the mold surface had a portion where the distribution of the micropores was nonuniform (e.g., near the center of FIG. 9(b)).

The moth-eye molds of Examples 1 to 4 had such a shape that an inverted moth-eye structure was superposed over an uneven shape corresponding to the uneven shape of the surface of the aluminum film. FIG. 10(a), FIG. 10(b), FIG. 11(a) and FIG. 11(b) show SEM images of cross-sections of the moth-eye molds of Examples 1, 2, 3 and 4. It is seen that, particularly, the surface of the moth-eye mold of Example 3 (FIG. 11(a)) had such a shape that an inverted moth-eye structure was superposed over an uneven structure whose two-dimensional size was around 1 μm. From this fact, it was confirmed that micropores were formed between a plurality of raised portions corresponding to the crystal grains of the aluminum film and in the surfaces of the plurality of raised portions. In other words, it was confirmed that micropores were formed at positions corresponding to the grain boundaries of the aluminum film and in the surfaces of the crystal grains.

The moth-eye mold of Example 2 had such a shape that an inverted moth-eye structure was superposed over a plurality of raised portions whose two-dimensional size distribution had two local maximums (200 nm and 400 nm). Where the larger one of the local maximums of the two-dimensional size distribution of the plurality of raised portions is L1 and the smaller one is L2, about 6% of the plurality of raised portions had a two-dimensional size of greater than L1−{(L1−L2)/2}=300 nm. The moth-eye mold of Example 4 had such a shape that an inverted moth-eye structure was superposed over a plurality of raised portions whose two-dimensional size distribution had two local maximums (150 nm and 200 nm). About 7.6% of the plurality of raised portions had a two-dimensional size of greater than L1−{(L1−L2)/2}=175 nm. Thus, in the moth-eye molds of Examples 2 and 4, 5% or more of the plurality of raised portions at the mold surface had a two-dimensional size of greater than L1−{(L1−L2)/2}.

Next, the integrating sphere reflectance and the haze value of the antireflection films of Examples 1 to 4 are described (Table 2).

TABLE 2

| Example | 1 | 2 | 3 | 4 |
|---|---|---|---|---|
| Integrating sphere reflectance of antireflection film (%) | 0.2 | 0.25 | 0.8 | 0.23 |
| Haze value of antireflection film (%) | 0.7 | 1.7 | 20.5 | 1.3 |

As seen from Table 2, in any of the Examples, the antireflection film had a reflectance of not more than 1.0%. The haze value has a correlation with the antiglare property. A larger amount of light transmission is scattered as the haze value increases, and accordingly, the antiglare property improves. The antireflection films of Examples 1 to 4 had an integrating sphere reflectance of not more than 1.0% and a haze value of not less than 0.7%, i.e., had excellent antireflection function and excellent antiglare function. Particularly in Examples 2 and 4, the antireflection films obtained had an integrating sphere reflectance of not more than 0.3% and a haze value of not less than 1% and not more than 5%. Thus, both the reflectance and the haze value were within preferred ranges.

Comparing Example 1 and Example 3 in which the crystal grain diameter distribution of the crystal grains of an aluminum film used in fabrication of a moth-eye mold had one local maximum, Example 3 in which the aluminum film had a greater average crystal grain diameter exhibited a greater haze value of the antireflection film. Comparing Example 1 and Example 4, the average crystal grain diameters of the aluminum films used in fabrication of the moth-eye molds were generally equal. However, Example 4 in which the crystal grain diameter distribution had two local maximums exhibited a greater haze value of the antireflection film.

It is inferred that the particularly higher haze values of the antireflection films of Examples 2, 3 and 4 (by 1% or more) were attributed to the fact that the crystal grain diameter distribution of the plurality of crystal grains of the aluminum film used in fabrication of the moth-eye mold was wider than a range of ±50 nm from the average grain diameter. Note that, it is inferred that, the particularly higher haze values of the antireflection films of Examples 2, 3 and 4 were attributed to the fact that the n-point average roughness Rz of the surface of the aluminum film was particularly greater in Examples 2, 3 and 4 (100 nm or greater).

As previously described with reference to FIG. 7, it is inferred from the reflectances of the aluminum films of Examples 1 to 4 that the scatterability of the aluminum films of Examples 1 to 4 was higher in order of Examples 3, 2, 4 and 1. The haze values of the antireflection films fabricated using the moth-eye molds of Examples 1 to 4 were higher in order of Examples 3, 2, 4 and 1 as described above. As the scatterability of the aluminum film increased, the haze value of the antireflection film fabricated using the moth-eye mold was higher.

Thus, by modifying the average crystal, grain diameter or the crystal grain diameter distribution of the aluminum film used in fabrication of the moth-eye mold, the haze value of the antireflection film manufactured by the moth-eye mold was adjusted.

INDUSTRIAL APPLICABILITY

A mold of the present invention can be widely used in formation of a surface which has a moth-eye structure, for example, formation of an antireflection film.

REFERENCE SIGNS LIST 14 porous alumina layer
14p micropore
16 base
18 aluminum film
18a crystal grains
18b grain boundaries
18s surface of aluminum film
100A moth-eye mold

The invention claimed is:
1. A method of fabricating a mold that has an inverted moth-eye structure in its surface, the inverted moth-eye struc- ture having a plurality of recessed portions whose two-dimensional size viewed in a direction normal to the surface is not less than 50 nm and less than 500 nm, the method comprising the steps of:
  (a) providing an aluminum film deposited on a base, the aluminum film having a thickness of not less than 0.5 μm and not more than 5 μm, a surface of the aluminum film having a plurality of crystal grains whose crystal grain diameter distribution has two local maximums, the larger one of the local maximums being not less than 200 nm;
  (b) after step (a), anodizing the surface of the aluminum film to form a porous alumina layer which has a plurality of minute recessed portions; and
  (c) after step (b), bringing the porous alumina layer into contact with an etching solution, thereby enlarging the plurality of minute recessed portions of the porous alumina layer.

2. The method of claim 1, wherein
an average crystal grain diameter of the plurality of crystal grains is not less than 200 nm and not more than 5 μm, and the larger local maximum of the crystal grain diameter distribution of the plurality of crystal grains is not less than 400 nm.

3. The method of claim 1, wherein 5% or more of the plurality of crystal grains have a grain diameter of greater than $R1-\{(R1-R2)/2\}$, where R1 is the larger local maximum of the crystal grain diameter distribution of the plurality of crystal grains, and R2 is the smaller local maximum.

4. The method of claim 1, wherein an n-point average roughness (Rz) of the surface of the aluminum film is not less than 100 nm.

5. The method of claim 1, wherein the crystal grain diameter distribution of the plurality of crystal grains is wider than a range of ±50 nm from an average crystal grain diameter.

6. The method of claim 1, further comprising the step (d) of further anodizing the surface of the aluminum film to grow the plurality of minute recessed portions,
  wherein, after step (c), step (d) and step (c) are further performed.

* * * * *